United States Patent [19]

Music

[11] Patent Number: 5,739,861
[45] Date of Patent: Apr. 14, 1998

[54] DIFFERENTIAL ORDER VIDEO ENCODING SYSTEM

[76] Inventor: John D. Music, P.O. Box 891028, Temecula, Calif. 92589-1028

[21] Appl. No.: 642,900

[22] Filed: May 6, 1996

[51] Int. Cl.⁶ .............................. H04N 7/12; H04J 11/02
[52] U.S. Cl. .............................. 348/391; 348/421
[58] Field of Search .................... 348/420, 421, 348/660, 409, 391; 345/153; 382/238, 251; H04N 7/12, 11/02

[56] References Cited

U.S. PATENT DOCUMENTS

| | | | |
|---|---|---|---|
| 4,597,005 | 6/1986 | Baleshta et al. | 348/391 |
| 4,816,901 | 3/1989 | Music et al. | 348/391 |
| 5,130,786 | 7/1992 | Murata et al. | 348/391 |
| 5,164,819 | 11/1992 | Music . | |
| 5,392,072 | 2/1995 | Rodriguez et al. | 348/420 |
| 5,486,863 | 1/1996 | Auyeung et al. | 348/421 |

Primary Examiner—Tommy P. Chin
Assistant Examiner—Luanne P. Din
Attorney, Agent, or Firm—Boniard I. Brown

[57] ABSTRACT

A television communications method and system particularly suitable for high definition, with narrow-band applications as for specialized broadcasting systems and video links using a block coding procedure to produce a system not wasteful of bandwidth caused by transmitting redundancies from multiple sources which do not contribute to picture quality. A differential order video encoding method (DOVE) provides a video coding scheme based on the need for true high-quality video with real-time TV encoding and delivery in fifty per cent of the bandwidth of the 4.5 MHZ vestigial sideband suppressed television system in universal use. Efficient coding algorithms, based on the finding and eliminating multiple source redundancies, characterizes the redundancies and creates, in real-time, an efficient set of codes for encoding only the information that is different, eliminating the need for full 4.5 MHZ bandwidth.

11 Claims, 1 Drawing Sheet

DIFFERENTIAL ORDER VIDEO ENCODING SYSTEM

BACKGROUND OF THE INVENTION

1. Field of the Invention

The present invention relates generally to television methods and means, and more particularly to television systems that conserve and are not wasteful of bandwidth caused by transmitting redundancies from multiple sources which do not contribute to a picture presentation quality, and more specifically to coding systems for transmitting only pixel data that is not repetitive. There exists and will exist a need for high definition television in relatively narrow bandwidths.

2. Prior Art

Television signal compression by block coding methods is the subject of prior patents of the inventor of the present invention. These prior patents relate to specific algorithms for linear coding of specific types of redundant data, and are not as adaptive as the present invention.

In sampled digital video, there is usually substantial redundancy, to maintain resolution it is necessary to sample at a rate of at least 2× the highest frequency component contained in the analog video stream. For NTSC video, this is a minimum of 9 MHZ (2×4.5 MHZ), but because the actual video contains some low frequency components, there is some redundancy in the samples.

Other redundancy is assured by oversampling the depth of each sample. For example, digitizing 8 bits per color × 3 colors (either R, G, B or Y, U, V) results in 24 bits per sample. Each sample then could represent one of about 16.7 million possible colors. Sampling at 512×480 would give 245,760 pixels. Even if it were possible for all 245,760 pixels to be of different colors, for any given video picture only 18 bits are required to represent 245,760 colors. Actually, because a picture is made up of objects of relatively constant color, there are far fewer than 245,760 actual colors in a given video frame.

Another form of redundancy in video is inter-frame. In a series of individual video frames, it is reasonable to predict that the differences between frames will be relatively small. Although taking advantage of inter-frame redundancy can generally result in about 600% additional compressibility, there is not always interframe redundancy. Depending on the actual individual video, interframe redundancy can range from very high to zero.

SUMMARY OF THE INVENTION

The present invention is a block coding method for television communications which is particularly suitable for high definition, yet narrow-band applications such as specialized picture transmission systems and video links. The block coding method provides a system that is not wasteful of bandwidth caused by transmitting redundancies from multiple sources which do not contribute to the quality of picture presentation. The invention utilizes a differential order video encoding (DOVE) scheme to produce true high-quality video with real-time TV encoding for delivery in about half of the bandwidth of the 4.5 MHZ vestigial sideband suppressed television system in universal use. Efficient coding algorithms, based on the concept of finding and eliminating multiple source redundancies, characterizing the redundancies and then creating, in real-time, an efficient set of codes for encoding only the information that is different, eliminating the need for full 4.5 MHZ bandwidth.

The objectives of DOVE are (a) to provide intra-frame coding that is nearly uniform for a wide variety of pictures, (b) to provide interframe coding which provides good results with relatively low data flow rate out of the encoder, taking into account the wide expected variability in interframe redundancy, (c) to at all times provide high-quality video consistent with TV broadcast standards, and (d) to provide a video coding method that can be easily implemented in microcircuit technology.

DESCRIPTION OF THE PREFERRED EMBODIMENT

Figure 1:
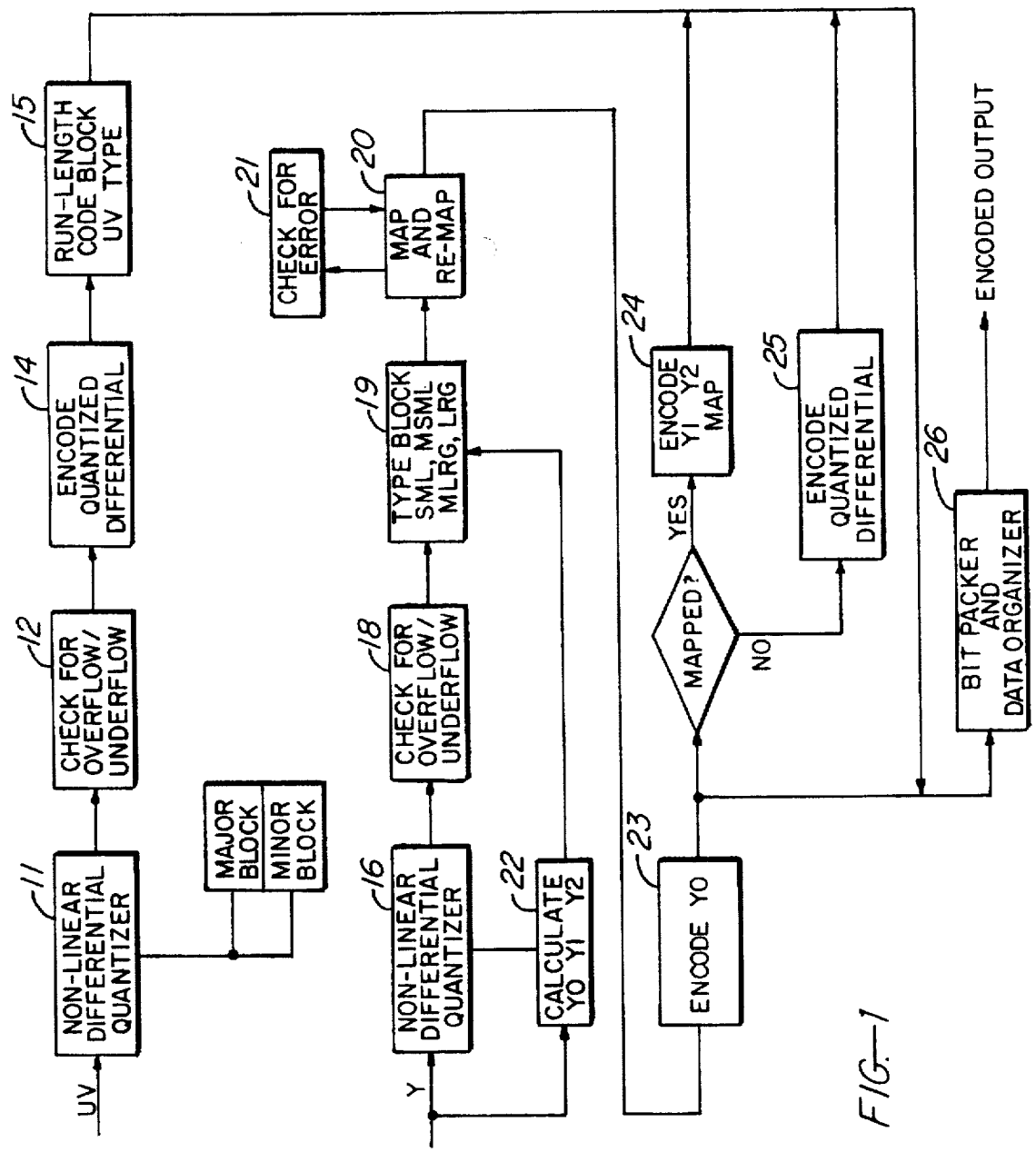
FIG. 1 is a functional flow diagram of the essential procedural elements of the differential order video encoding (DOVE) coding method of the present invention.

The differential order video encoding (DOVE) system uses YUV color coordinates to take advantage of the lower frequency color components by subsampling U and V with respect to Y samples. Although known in the art, there are set forth below the manufacturers standard for color video, and symbols definitions, with respect to which reference is made to *Reference Data For Radio Engineers*, H. W. Sams and Co., Inc., ITT Corp., Fifth Edition, pp. 28–33.

Manufacturers standard:

U is a luminance and color difference signal

V is a luminance and color difference signal

Y is a luminance and color difference signal dU=pixel U−previous pixel U dV=pixel V−previous pixel V dY=pixel Y−previous pixel Y dx=either dU or dV, as substituted in the model of U, V quantizer herein described YO=sum of all pixel values in a block, divided by the quantity of pixels in a block locnt=quantity of pixels in a block <YO hicnt=quantity of pixels in a block=>YO cpt =sum of all "quantized" pixels in a block divided by the quantity of pixels in a block abs(dx)=dx rounded to the nearest integer with fractions= >0.500 rounded up to the next higher integer and all other fractions rounded down to the next lower integer sgn(dx)=the sign of dx represented by −1 if dx is minus; 1 if dx is positive; and 0 if dx is 0.

Seven-bit RGB values can be converted into seven-bit YUV values with the following integer arithmetic algorithm based on world standard RGB ratios:

$$Y=((38*r)+(75*g)+(15*b))/128$$

$$U=64+(((-22*r)+(-42*g)+(64*b))/128)$$

$$V=64+(((64*r)+(-54*g)+(-10*b))/128)$$

The purpose of the +64 offset for U and V is so that they may be handled and processed as positive integers. This fixed offset is removed in the algorithm to convert back into RGB video display as shown below:

$$red=Y+(178*(V-64)/128)$$

$$grn=Y+(89*(V-64)/128)-(43*(U-64)/128)$$

$$blu=Y+(222*(U-64)/128)$$

The first step in the DOVE coding process is best described as a non-linear differential quantizer 11. If information is considered as "the difference that makes a difference" the concept of differential quantization is easier understood. Individual pixels are arranged in blocks. For example, each major such block (6×6) is further arranged into 4 smaller (minor) blocks of, for example, (3×3). U and V values for both the major block and 4 minor blocks are obtained by taking the sum of all U's and V's in a 3×3 block, divided by 9, and then sum the 4 minor block U's and V's, divided by 4. For simplicity of implementation, the division by 9 is approximated with integer arithmetic using $\frac{1}{16}+\frac{1}{32}+\frac{1}{64}$. Thus, we obtain values of U and V, subsampled with respect to Y, in ratios of 6:1:1 and 3:1:1. These values are then quantized using a differential quantizer similar to a quantizer used for the Y components. A model of the U, V quantizer is shown below, where dX means either dU or dV:

```
if abs(dX) >  0 and abs(dX) <  2 then dX <---  1 * (sgn(dX))
if abs(dX) >  1 and abs(dX) <  5 then dX <---  3 * (sgn(dX))
if abs(dX) >  4 and abs(dX) < 10 then dX <---  7 * (sgn(dX))
if abs(dX) >  9 and abs(dX) < 17 then dX <--- 13 * (sgn(dX))
if abs(dX) > 16 and abs(dX) < 32 then dX <--- 24 * (sgn(dX))
if abs(dX) > 31 and abs(dX) < 47 then dX <--- 39 * (sgn(dX))
if abs(dX) > 46 then dX <--- 54 * (sgn(dX))
```

There is utilized a test 12 for overflow and underflow out of the quantizer 11, whereby if dX+Previous X>127 or <0 then dX ← next lower quantize value, then test again. The 6×6 UVs are differenced from the preceding (horizontal) block, and these differences are quantized. The 4 individual small blocks (3×3) are differenced from the large block. After quantization, if the difference of any one of the 4 small blocks exceeds a threshold, then that 3×3 block is encoded 14, together with the large block. Each 6×6 block has a single bit associated therewith to indicate whether the encoding is for a single large block or the encoding is for the large block plus one or more small blocks. Thus, the subsampling ratio is dynamically variable between 8:1:1 and 3:1:1, depending on the setting of the threshold compared to the actual variance in U, V. Quantized U and V differentials are encoded, both for the large blocks and for any small blocks whose values are different from the large blocks by an adjustable error (UVerr). Some actual encoding results are as follows:

| dU,dV | Code | 0018 Qty | 0036 Qty |
|---|---|---|---|
| −54 | 100 1111 | 0 | 0 |
| −39 | 101 1111 | 11 | 0 |
| −24 | 110 1111 | 132 | 0 |
| −13 | 111 1111 | 305 | 5 |
| −7 | 1 0111 | 1,118 | 129 |
| −3 | 1 011 | 1,944 | 1,346 |
| −1 | 1 01 | 2,102 | 2,848 |
| 0 | 0 | 4,639 | 5,005 |
| 1 | 0 01 | 2,131 | 2,795 |
| 3 | 0 011 | 2,017 | 1,357 |
| 7 | 0 0111 | 1,189 | 92 |
| 13 | 000 1111 | 312 | 2 |
| 24 | 001 1111 | 120 | 1 |
| 39 | 010 1111 | 20 | 0 |
| 54 | 011 1111 | 0 | 0 |
| Total dU,dV | | 16,040 | 13,580 |
| Large Blocks | | 6,720 | 6,720 ((510/6) −1) * (480/6) |
| Small Blocks | | 1,300 | 70 qty exceeding UVerr > 5 |
| Total Encoded bits** | | 59,512 | 36,203 |
| Bits/Pixel | | 0.243 | 0.148 |

| dU,dV | Code | 0018 Qty | 0036 Qty |
|---|---|---|---|

**Includes overhead for begin row and coding the 6:1:1 and 3:1:1 block characterizations.

As will be understood, for the two sample pictures chosen, the UV components are reduced from 14 bits to 0.243 and 0.148 for ratios of 58:1 and 94:1, respectively. CCIR specifies UV subsampling of 4:2:2 for highest quality studio work while NTSC uses 4:1:1. By using 3:1:1, DOVE is more accurate than NTSC, but not quite as accurate as the highest quality studio video.

Typical coding for UV components would be:

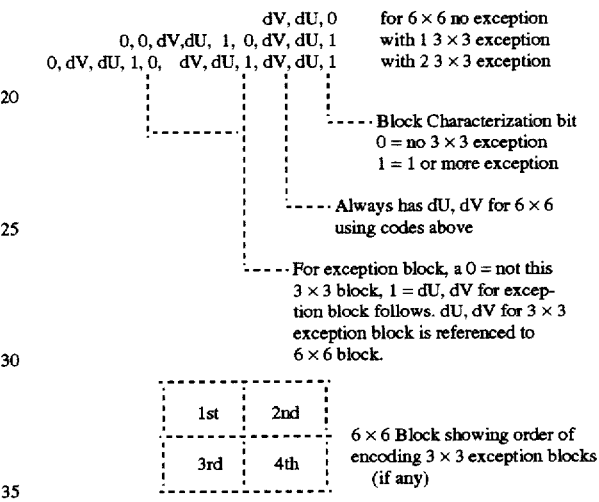

With only limited added complexity, the characterization bit for each 6×6 block in a row of blocks can be compressed by putting these bits in a stream at the front of each row of blocks. The compression takes place by run-length coding 15 the stream of such bits, because there is a high probability of the characterization bit being a "0" (a lot of redundant "0s").

The algorithm for run length coding of these bits is set forth below. The following subroutine presumes that the characterization bit is in a memory element, UVbuf (dimension) whose dimension is equal to the total number of 6×6 blocks in a row. (85 for 510 pixels/H) The resultant lengths of runs (1's or 0's) is saved in memory, LGTHbuf.

```
rnlgth:   ' subroutine to runlength code
' to run length 0s and 1s
lgth = 0 : flip = 0 ' the first bit is ALWAYS = 0, meaning no
          exception allowed for 1st block.
addrs = 0
for lup = 0 to 84
if UVbuf(lup)=flip then go to rnlg2 ' if this bit same, keep going
if flip = 0 then flip = 1 else flip = 0 ' else reverse bit
LGTHbuf(addrs) = lgth                   ' save run length
addrs.<-- addrs + 1                     ' incr'mnt address
lgth = 0                                ' and reset length to 0
rnlg2:
lgth <-- lgth + 1
next lup
get the last length value
LGTHbuf(addrs) = lgth
RETURN
```

The individual run lengths are coded as follows:

| Length | Code | 0018 Qty | 0036 Qty |
|---|---|---|---|
| 85 | 000 0 | 9 | 45 |
| 1 | 001 0 | 322 | 43 |
| 2 | 010 0 | 148 | 5 |
| 3 | 011 0 | 50 | 4 |
| 4 | 100 0 | 25 | 2 |
| 5 | 101 0 | 21 | 2 |
| 6 | 110 0 | 10 | 2 |
| 7 | 111 0 | 15 | 2 |
| 8 | 0001000 1 | | |
| 9 | 0001001 1 | | |
| | other | 306 | 69 |
| 10-83 | xxxxxx 1 | | |
| 84 | 1010100 1 | | |
| | total | 906 | 174 |
| | total RL bits | 3,848 | 972 |
| Compression of Char'tnt Bit | | 1.4:1 | 7:1 |

For purposes of encoding Y information, DOVE uses a 3×3 block and the Y components are encoded using 6 different techniques.

1) Average Y in 3×3 Block (YO)
2) Low Amplitude (Small Block)
3) Medium Low Amplitude (Medium Small Block)
4) Medium High Amplitude (Medium Large Block)
5) High Amplitude (Large Block)
6) Mapped Y1, Y2 Based on Allowable Error YO is the sum of all Ys in 3×3 block, divided by 9. For simplicity of implementation, the division by 9 is approximated with integer arithmetic using $1/16+1/32+1/64$. The sum of $1/16=0.06250$, $1/32=0.03125$, and $1/64=0.015625$, is $0.109375$, which is less than 2% of $1/9(0.1111)$. The error is therefore negligible. Y130 Y2+. . . Y9/ 9=Average YO. Integer arithmetic provides the important advantage that it can be performed easily using digital logic, as by a binary adder chip. YO differentials, using YO of previous block (first YO in each row is absolute YO), are then quantized 16, as indicated at 16 (FIG. 1).

Small Blocks are characterized as blocks where the quantized differential Y for all 9 pixels is within +/− with respect to quantized YO. Medium Small Blocks have quantized differentials within the range of +/−5. Medium Large Blocks have all 9 quantized differentials with the range of +/−26, while Large Blocks have all 9 quantized differentials in the full range.

A simple subtraction of the luminosity of adjacent pixels where dY=(Yn−Yn−1) results in doubling the number of bits needed to represent dY compared to Y, because then they are +/− full-scale values instead of all positive integers. However, redundancy is substantially increased because there is inherently more redundancy in dY than in Y. This is because the change, or difference, between pixels is predictably small. For example, there might be a mostly random distribution of absolute values for Y but a very high probability of 0, +/−1, and +/−2 from the subtraction.

The DOVE method takes advantage of the redundancy created by the adjacent pixel differential. Furthermore, to increase the redundancy even more, and also to reduce the number of bits required to represent dY, DOVE quantizes the differential values represented by dY as indicated at 16 (FIG. 1). dYout=dYin !quantized!

The concept of quantizing differences may be understood by considering the nature of video information. The human eye is extremely non-linear, and is sensitive to and can detect small absolute differences in adjacent elements of brightness very much more than it can detect absolute large differences. The imagers utilized in TV cameras are essentially linear devices. To make them more like the human eye, TV cameras employ a non-linear correction called "Gamma Correction", which gives much more accuracy and sensitivity to low levels than to high levels of brightness.

Based upon an understanding of the mechanism of the human eye and upon considerable experimentation and empirical testing, there has been developed a set of values used for quantizing the difference in luminosity between adjacent pixels, which quantization values are shown below:

The values input to this quantizer are 0 to +/−127.

dY QUANTIZER FOR PIXEL Delta Ys AND Delta BLOCK YOs if dY = 0 then dY <— 1
if abs(dY) < 3 then dY <000 1 * (sgn(dY))
if abs(dY) > 2 AND abs(dY) < 8 then dY <— 5 * (sgn(dY))
if abs(dY) > 7 AND abs(dY) < 19 then dY <— 13 * (sgn(dY))
if abs(dY) > 18 AND abs(dY) < 34 then dY <— 26 * (sgn(dY))
if abs(dY) > 33 AND abs(dY) < 51 then dY <— 42 * (sgn(dY))
if abs(dY) > 50 AND abs(dY) < 68 then dY <— 59 * (sgn(dY))
if dY > 67 then dY <— 76 * (sgn(dY))

These quantized differentials are checked for overflow and underflow as indicated at 18 (FIG. 1). If the quantized dY+Previous Value are >127 or <0, then the next lower quantized value is used, then checked again. There being 14 individual values out of the quantizer 16 (namely, +/−1, +/−5, +/−13, +/−26, +/−42, +/−59, and +/−76) it would only require 4 bits to represent all the values for dY. However, because there is a predictable frequency of occurrence for specific values for some of the encodings, variable bit-length codes are used. For reasons hereinafter made clear, pixels are assigned to groups, 19 or blocks of 3×3 ; pixels for purposes of encoding Y information.

Small Blocks, those where all 9 pixels have dYs of +/−1, are coded with 1 bit per pixel +3 bits for block ID, resulting in 1.33 bits/pixel for compression of 5.25:1 as follows:

| dY | Small Block dY Code |
|---|---|
| −1 | 1 |
| 1 | 0 |

Medium small blocks, those where all 9 pixels have dYs in the range of +/−5 are coded into 2 bits/pixel +3 bits for block ID, resulting in 2.33 bits/pixel for a compression of 3:1 as follows:

| dY | Med Sml Block dY Code |
|---|---|
| −5 | 11 |
| −1 | 10 |
| 1 | 00 |
| 5 | 01 |

Medium Large Blocks, those where all 9 pixels have dYs in the range of +/−26 are coded into 3 bits per pixel +3 bits of block ID, resulting in 3.33 bits/pixel for 2.1:1 compression as follows:

| dY | Med Lrg Block dY Code |
|---|---|
| −26 | 100 |
| −13 | 101 |
| −5 | 110 |
| −1 | 111 |
| 1 | 000 |
| 5 | 001 |
| 13 | 010 |
| 26 | 011 |

Set forth below are the coding and actual statistics of dY for pixels in Large Blocks where the dY for at least 1 pixel in the block exceeded +/−26. These blocks use variable bit length codes to take advantage of expected probabilities of frequency of occurrence for various dYs. The two test pictures shown represent high density (0036), and low density (0018) pictures.

| dY | Large Block dY Code | 0018 Qty | 0036 Qty |
|---|---|---|---|
| −76 | 10 111 | 10 | 27 |
| −59 | 11 111 | 54 | 260 |
| −42 | 1 011 | 362 | 1,876 |
| −26 | 10 0 | 467 | 3,936 |
| −13 | 11 0 | 490 | 5,301 |
| −5 | 10 01 | 217 | 2,471 |
| −1 | 11 01 | 89 | 898 |
| 1 | 00 01 | 121 | 1,246 |
| 5 | 01 01 | 249 | 2,053 |
| 13 | 00 0 | 599 | 3,805 |
| 26 | 01 0 | 542 | 3,149 |
| 42 | 0 011 | 293 | 2,513 |
| 59 | 00 111 | 38 | 398 |
| 76 | 01 111 | 6 | 30 |
| Total Pixels | | 3,537 | 27,954 (9 × Total Large Blocks) |
| Total Bits | | 12,158 | 96,331 |
| Bits/Pixel | | 3.44 | 3.45 |
| Add for Blk ID | | 0.33 | 0.33 |

It will be understood that quantizing these differentials and variable bit length coding resulted in a savings of nearly 50% from the original Y data, and about 13% from a straight forward coding of dYs. Of course, the actual coding results will vary from picture to picture, depending on the statistical distribution. The codes assignments were chosen to obtain uniform coding results over a wide range of expected distributions of picture density. It has been determined both from a theoretical view and from examining a wide variety of individual frames of very high quality video, that quantizing luminosity differences between adjacent pixels with the above values will produce negligible difference between the original and the quantized picture. Although the quantization involves certain distortion in the values, the quantizer 18 was designed to keep discernable distortion to a minimum.

Some examples of quantizing differentials are shown:

| Orig Value | Diff. | Qntz Diff. | New Value | Error |
|---|---|---|---|---|
| Exmpl 1 Typical Video Slope | | | | |
| Yn-1  10 | — | — | 10 | 0 |
| Yn    16 | +6 | +5 | 15 | −1 |
| Yn+1  29 | +14 | +13 | 28 | −1 |
| 84 | +56 | +59 | 87 | +3 |
| 89 | +2 | +1 | 88 | −1 |
| 90 | +2 | +1 | 89 | −1 |
| 90 | +1 | +1 | 90 | 0 |
| 90 | 0 | +1 | 91 | +1 |
| 90 | −1 | −1 | 90 | 0 |
| 90 | 0 | +1 | 91 | +1 |
| Exmpl 2 Impulse Response (63% Full Scale) | | | | |
| 10 | — | — | 10 | 0 |
| 90 | +80 | +76 | 86 | −4 |
| 90 | +4 | +5 | 91 | +1 |
| 90 | −1 | −1 | 90 | 0 |
| 90 | 0 | +1 | 91 | +1 |
| Exmpl 3 Impulse Response (100% Full Scale) | | | | |
| 0 | — | — | 0 | 0 |
| 127 | +127 | +76 | 76 | −51 |
| 127 | +51 | +59 .. +42 | 118 | −9 |
| 127 | +9 | +13 .. +5 | 123 | −4 |
| 127 | +4 | +5 .. +1 | 124 | −3 |
| 127 | +3 | +5 .. +1 | 125 | −2 |
| 127 | +2 | +1 | 126 | −1 |
| 127 | +1 | +1 | 127 | 0 |

Because the signals are bandwidth limited, and therefore rise times are limited, they cannot go from 0 to full scale in one sample time. The maximum quantized differential of 76 was chosen based on the theoretical maximum slewing rate of a signal which has been bandwidth limited to 4.5 MHZ and sampled at at least 2×4.5 MHZ. If the rate of change of input signal were not limited to 4.5 MHZ, the effect of quantizing to a maximum of 76 would be to limit the rise time as if the signal were limited to an effective bandwidth of ½ sample rate.

In mapping of blocks based on allowable error, the step 20, 21 in the coding process provides an important additional level of compression of Y information. It comprises first partitioning the 3×3 block into 2 values of luminosity, Y1 and Y2. Y1 being the sum of all pixels in the block whose value is greater than YO, divided by the quantity of such pixels, and Y2 being the sum of all pixels in the block whose value is equal to or less than YO, divided by the quantity of such pixels.

The divisor in both cases always is an integer in the range of 1 to 8 by the following logic:

if locnt>0 then Y2=Y2/locnt if hicnt>0 then Y1=Y1/hicnt if hicnt=0 or locnt=0 then Y1=cpt:Y2=cpt Where locnt is the count of pixels=<YO and hicnt is count of pixels>YO. Discrepencies, e.g., 9 pixels >YO are possible because of minor changes due to quantization, cpt is the average of all 9 quantized pixels.

Because if hicnt or locnt are 0, both Y1 and Y2 are forced to=cpt, and the count of 9 is never used. Thus, the actual possible counts used as divisors are in the range of 1 to 8. By subtracting 1 from the actual count, the code for count becomes 0 to 7, and thus is only 3 bits. The maximum sum of 8 pixels is 127×8=1,016, which is a 10 bit number. However, since accuracy of Y1 and Y2 is not of prime importance, this can be simplified and the Y value used to obtain the sums for Y1, Y2 of each pixel divided by 2, truncated. Thus, the maximum sum value is 63×8=504, resulting in a 9 bit value, and then a 9 bit dividend and a 3 bit divisor.

The required division can be done in a read-only-memory look-up table. The 9 bit dividend+the 3 bit divisor forms a 12 bit address for a read-only-memory whose 7 bit data out is the quotient. (4096×7=28,672 bit ROM.)

Using this simplified integer arithmetic, we have values for Y1 (the average Y for all pixels exceeding YO) and Y2 (the average Y for all pixels=YO). This step is sometimes called luminance partitioning. The next step in this process is to generate a 9 bit map in which a 1 means the pixel will be represented by Y1, and 0 means the pixel will be represented by Y2.

After the map is generated (1 bit per pixel) we have the option of the step called REMAP. After luminance partitioning and mapping, the block is then decoded and a pixel-by-pixel comparison is made with the values of the original in that particular block. If the error created by mapping is within acceptable limits, that block is encoded as a mapped block. Otherwise, it is a small, medium small, medium large or large block, encoded as outlined above.

There are two aspects of error tolerance. One is the error in Y caused by mapping, and the other is allowing N pixels to exceed the error. Each of three types of blocks (medium small, medium large, and large) are submitted to the mapping process and tested for error 21. Since small blocks encode in only 1 bit per pixel, the mapping process does not provide additional compression. Therefore small blocks are not submitted to the mapping process.

The quantizing and encoding YO differentials 23 is by using YO of a previous block where first YO in each row is absolute YO, wherein small blocks are characterized as blocks where the quantized differential Y for all 9 pixels is within +/−1 with respect to quantized YO and medium small blocks have quantized differentials within the range of +/−5 and medium large blocks have all 9 quantized differentials with the range of +/−28, while large blocks have all 9 quantized differentials in the full range. Encoding 25 quantized differentials, if not already mapped, is done, and the buffering and organizing 26 data for output is done.

Thus there has been shown and described a novel differential order video encoding system (DOVE) which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. In a digitally coded, data compressed television system, the improvement for high definition with narrow bandwidth, comprising:

means for calculating adjacent pixel Y luminosity differential, means for generating nonlinear quantization of the adjacent pixel Y luminosity differential, means for variable bit length encoding of said nonlinear quantized pixel Y luminosity, and means for quantizing and encoding YO differentials, using YO of previous block where first YO in each row is absolute YO wherein small blocks are characterized as blocks where the quantized differential Y for all 9 pixels is within +/−1 with respect to quantized YO, medium small blocks have quantized differentials within the range of +/−5, and medium large blocks have all 9 quantized differentials within the range of +/−26, while large blocks have all 9 quantized differentials in the full range.

2. In a digitally coded, data compressed television system, the improvement for high definition with narrow bandwidth, comprising:

means for calculating adjacent pixel Y luminosity differential, means for generating nonlinear quantization of the adjacent pixel Y luminosity differential, means for variable bit length encoding of said nonlinear quantized pixel Y luminosity, means for transmitting the encoded signal for remote reception, and means for receiving and decoding the transmitted signal using an integer arithmetic algorithm where $$red = Y + (178*(V-64)/128)$$

$$grn = Y + (89*(V-64)/128) - (43*(U-64)/128)$$

$$blu = Y + (222*(U-64)/128).$$

3. A high definition, low bandwidth, real-time digitally coded, data compressed television system, comprising:

means for converting an RGB analog television signal to digital YUV coordinates by converting x-bit RGB values to x-bit YUV values in accordance with an integer arithmetic algorithm based on world standard RGB ratios including an analog to digital, means for differential quantizing and encoding U and V values based on a major 6×6 block and four minor 3×3 blocks, means for luminosity differential quantizing for encoding Y information using a 3×3 block and Y components encoding using one of the following techniques: (a) averaging Y in 3×3 block (YO), (b) quantizing differential Y for all 9 pixels within +/−1 with respect to quantized YO, (c) quantizing luminosity differentials within the range of +/−5, (d) quantizing all 9 quantized luminosity differentials within the range of +/−26, (e) quantizing luminosity differentials having all 9 pixels in the full range, and (f) mapping Y1, Y2 based on allowable error, means for subtracting the luminosity of adjacent pixels where dY=(Yn−1), resulting in doubling the number of bits needed to represent dY compared to Y, means for finding YOs as the sum of all Ys in 3×3 blocks divided by 9 approximated with integer arithmetic using $1/16 + 1/32 + 1/64$, means for quantizing and encoding YO differentials, using YO of previous block where first YO in each row is absolute YO wherein small blocks are characterized as blocks where the quantized differential Y for all 9 pixels is within +/−1 with respect to quantized YO, medium small blocks have quantized differentials within the range of +/−5, and medium large blocks have all 9 quantized differentials within the range of +/−26, while large blocks have all 9 quantized differentials in the full range, means for transmitting the coded signal for remote reception, and means for receiving and decoding the transmitted signal using an integer arithmetic algorithm where $$red = Y + (178*(V-64)/128)$$

$$grn = Y \pm (89*(V-64)/128) - (43*(U-64)/128)$$

blu=Y+(222*(U−64)/128).

4. A high definition system according to claim 3, wherein: said means for converting with an integer arithmetic algorithm comprises an analog to digital converter.

5. A coding method for high definition, narrow bandwidth video, comprising the steps of:

converting a color video signal to digital Y U V values, non-linear differential quantizing to arrange individual pixels in major blocks, with each said block further arranged into minor blocks, whereby U and V values for both the major block and minor blocks are the sum of all U's and V's in a minor block divided by the number of pixels in the minor block to provide values of U and V subsampled with respect to Y, quantizing the U and V values according to dx where dx means either dY or dV, and

```
if abs(dx) >  0 and abs(dx) <  2 then dx <---  1 * (sgn(dx))
if abs(dx) >  1 and abs(dx) <  5 then dx <---  3 * (sgn(dx))
if abs(dx) >  4 and abs(dx) < 10 then dx <---  7 * (sgn(dx))
if abs(dx) >  9 and abs(dx) < 17 then dx <--- 13 * (sgn(dx))
if abs(dx) > 16 and abs(dx) < 32 then dx <--- 24 * (sgn(dx))
if abs(dx) > 31 and abs(dx) < 47 then dx <--- 39 * (sgn(dx))
if abs(dx) > 46 then dx <--- 54 * (sgn(dx)),
``` testing for overflow and underflow from the quantizing whereby if dx+previous dx>127 or <0 then dx<next lower quantize value, then testing again, differencing the major block UVs from the preceding quantizing and differencing the minor blocks from the large block and quantizing, and if the difference of any one of the minor blocks exceeds a threshold, encoding that minor block encoded together with the major block, assigning a single bit associated with a major block to indicate if the encoding is for a single large block or if the encoding is for the large block plus one or more small blocks, encoding quantized U and V differentials encoded both for the major blocks and for any minor blocks whose values are different from the major blocks by an adjustable error (UV(err)), luminosity differential quantizing for encoding Y information using a minor block and the Y components, encoding using one of the following different techniques: (a) averaging Y in 3×3 block (YO), (b) quantizing differential Y for all 9 pixels within +/−1 with respect to quantized YO, (c) quantizing luminosity differentials within the range of +/−5, (d) quantizing all 9 quantized luminosity differentials within the range of +/−26, (e) quantizing luminosity differentials having all 9 pixels in the full range, and (f) mapping Y1, Y2 based on allowable error, subtracting the luminosity of adjacent pixels where dY= (Yn−Yn−1) resulting in doubling the number of bits needed to represent dY compared to Y, finding YOs as the sum of all Ys in minor blocks divided by the number of pixels therein, quantizing and encoding YO differentials using YO of previous block where first YO in each row is absolute YO wherein small blocks are characterized as blocks where the quantized differential Y for all pixels is within +/−1 with respect to quantized YO, and medium small blocks have quantized differentials within the range of +/−5, and medium large blocks have all quantized differentials with the range of +/−26, while large blocks have all quantized differentials in the full range, and formatting encoded data by bit packing and organizing the coded data to accommodate video signal format.

6. A coding method according to claim 5, and further including:

run length coding the U and V block characterization bits to eliminate redundant zeros.

7. A coding method according to claim 5, wherein said major blocks are 6×6 blocks and said minor blocks are 3×3 blocks.

8. A coding method according to claim 5, wherein said major blocks are 8×8 blocks and said minor blocks are 4×4 blocks.

9. A method according to claim 5, and further comprising:

bit mapping blocks based on allowable error to provide an additional level of compression of Y information, by luminance partitioning the minor block into two values of luminosity Y1 and Y2, Y1 being the sum of all pixels in the block whose value is greater than YO, divided by the quantity of such pixels, and Y2 is the sum of all pixels in the block whose value is equal to or less than YO divided by the quantity of such pixels, the divisor in both cases always being an integer in the range of 1 to 8 according to the following logic:

if locnt>0 then Y2=Y2/locnt if hicnt>0 then Y1=Y1/hicnt if hicnt=0 or locnt=0 then Y1=cpt:Y2=cpt, using simplified integer arithmetic to obtain values for Y1, the average Y for all pixels exceeding YO, and Y2, and generating a 9 bit map in which a 1 means the pixel will be represented by Y1 and 0 means the pixel will be represented by Y2.

10. Coding means for high definition, narrow bandwidth video transmission, comprising:

means for converting a color video signal to digital Y U V values, means for non-linear differential quantizing to arrange individual pixels in major blocks, with each said block further arranged into minor blocks, whereby U and V values for both the major block and minor blocks are the sum of all U's and V's in a minor block divided by the number of pixels in the minor block to provide values of U and V subsampled with respect to Y, means for quantizing the U and V values according to dx where dx means either dU or dV, and

```
if abs(dx) >  0 and abs(dx) <  2 then dx <---  1 * (sgn(dx))
if abs(dx) >  1 and abs(dx) <  5 then dx <---  3 * (sgn(dx))
if abs(dx) >  4 and abs(dx) < 10 then dx <---  7 * (sgn(dx))
if abs(dx) >  9 and abs(dx) < 17 then dx <--- 13 * (sgn(dx))
if abs(dx) > 16 and abs(dx) < 32 then dx <--- 24 * (sgn(dx))
if abs(dx) > 31 and abs(dx) < 47 then dx <--- 39 * (sgn(dx))
if abs(dx) > 46 and dx <--- 54 * (sgn(dx)),
``` means for testing for overflow and underflow from the quantizer, whereby if dx+previous x>127 or <0 then dx<next lower quantize value, then testing again, means for differencing the major block UVs from the preceding quantizing and differencing the minor blocks from the large block and quantizing, and if the difference of any one of the minor blocks exceeds a threshold, encoding that minor block encoded together with the major block, means for assigning a single bit associated with a major block to indicate if the encoding is for a single large block or if the encoding is for the large block plus one or more small blocks, means for encoding quantized U and V differentials encoded both for the major blocks and for any minor blocks whose values are different from the major blocks by an adjustable error (UV(err)), means for luminosity differential quantizing for encoding Y information using a minor block and the Y components, means for encoding using one of the following different techniques: (a) averaging Y in 3×3 block (YO), (b) quantizing differential Y for all 9 pixels within +/−1 with respect to quantized YO, (c) quantizing luminosity differentials within the range of +/−5, (d) quantizing all 9 quantized luminosity differentials within the range of +/−26, (e) quantizing luminosity differentials having all 9 pixels in the full range, and (f) mapping Y1, Y2 based on allowable error, means for subtracting the luminosity of adjacent pixels where dY=(Yn−Yn−1) resulting in doubling the number of bits needed to represent dY compared to Y, means for finding YOs as the sum of all Ys in minor blocks divided by the number of pixels therein, means for quantizing and encoding YO differentials using YO of previous block where first YO in each row is absolute YO wherein small blocks are characterized as blocks where the quantized differential Y for all pixels is within +/−1 with respect to quantized YO, and medium, small blocks have quantized differentials within the range of +/−5, and medium large blocks have all quantized differentials with the range of +/−26, while large blocks have all quantized differentials in the full range, and means for formatting encoded data by bit packing and organizing the coded data to accommodate the video signal format.

11. A method according to claim 9, and further including:

remapping in a process step using a lookup table to convert the bit maps into variable bit length codes based on expected probability of occurrence, and the remap process is based on the assumption of allowable error in disallowing certain bit maps that are (1) low probability, and (2) not likely to cause discernable error, said maps being of the form

```
0 1 0       1 0 1
1 0 1   or  0 1 0
0 1 0       1 0 1
``` wherein either of these maps is generated only for low amplitude blocks, with an illogical map bit pattern most likely caused by noise, the lookup table for remap comprising 9 bits in 512 possible maps, and outputs of variable bit length codes representing 84 possible maps.

* * * * *